United States Patent Office 2,765,259
Patented Oct. 2, 1956

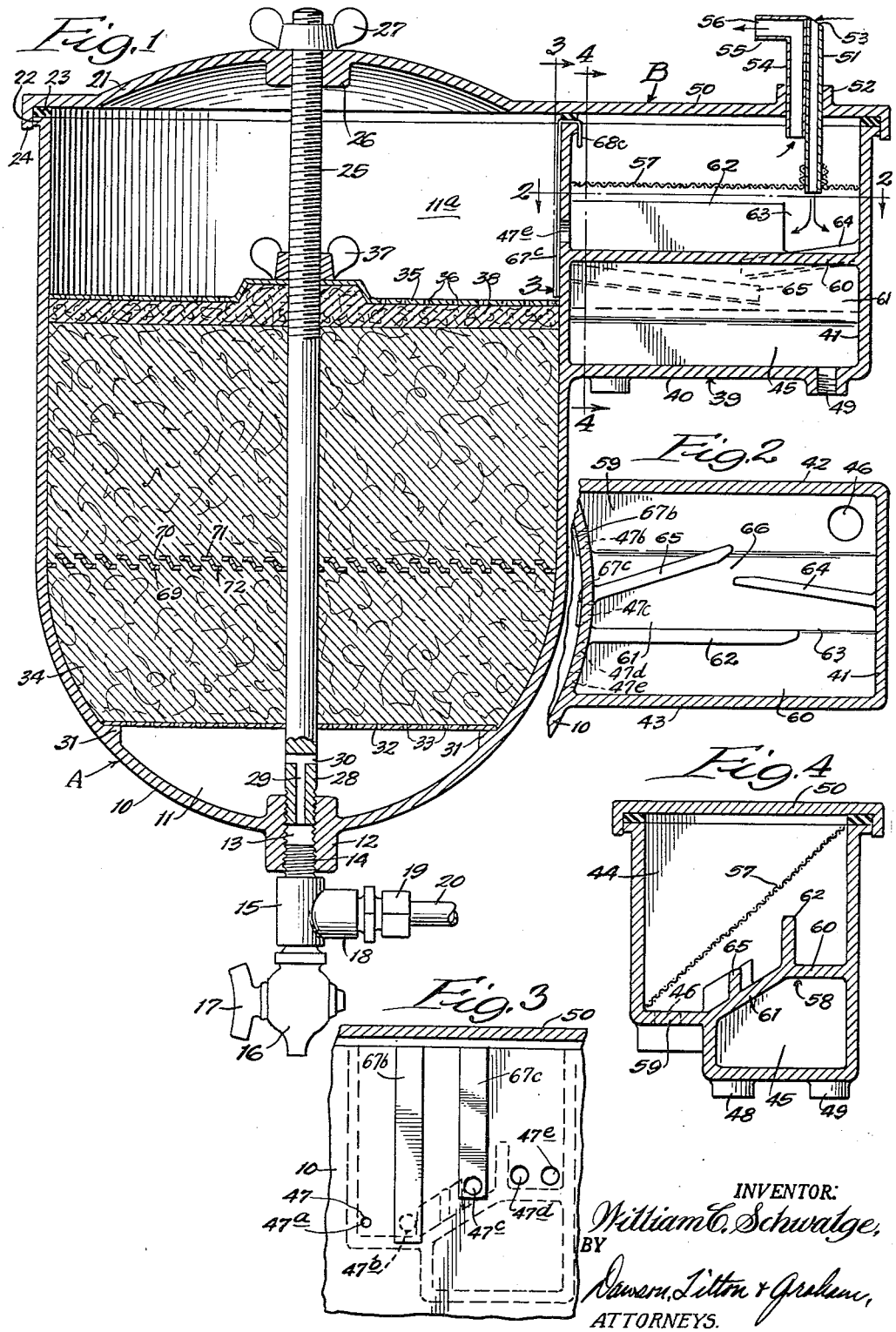

2,765,259

OIL RECLAIMING APPARATUS

William C. Schwalge, Lake Zurich, Ill.

Application February 16, 1954, Serial No. 410,507

18 Claims. (Cl. 196—16)

This invention relates to oil reclaiming apparatus, and more particularly to such apparatus in which an evaporating chamber is provided with a heat exchange surface different zones of which may be heated to different temperatures, and means are provided for varying the flow of oil onto the hotter zones of the floor and to withdraw oil from the coolest zone of the floor. The device is preferably combined with an oil filter such as is used in automobiles, trucks, etc. The invention is useful, however, in other settings, as for example, in relatively large, stationary installations such as might be found in filling stations for reclaiming used oil.

Oil filters are commonly used in automobiles and trucks and other similar vehicles having internal combustion engines. Although the use of reclaiming apparatus with oil filters is known, so far such apparatus is not used as prevalently as the oil filters themselves. The reason for this may be that certain problems have been presented in the use of reclaiming apparatus with oil filters.

Commonly, the structure used to reclaim oil or to purge oil of certain volatile impurities such as gasoline and water that accumulates within the lubricating oil of engines, is to provide an evaporator which in turn heats the oil and thereby causes the volatile gasoline and oil and other substances carried by the oil to be evaporated. The difficulty has been in regulating the heat applied to the evaporator unit, and frequently the temperature within the evaporator becomes so high that the more volatile fractions of the oil are vaporized with the result that there is a constant loss of oil. This problem is especially difficult in warm weather when the oil is normally at a relatively high temperature.

It is accordingly an object of this invention to provide apparatus wherein the defects in prior structures are overcome. Another object of the invention is to provide structure for reclaiming or purging lubricating oil of its volatile impurities by means of applying controlled heat to an evaporator unit through which the oil flows. Still another object is in the provision of an evaporator unit wherein selected portions of the oil flowing therethrough are heated within the evaporator to much higher temperatures than other portions of the oil flowing therethrough. Yet another object is in the provision of an evaporator unit adapted for use with oil filters and in which a plurality of inlet ports are provided and wherein, additionally, means are provided to selectively close certain of the ports to regulate the flow of oil to portions of the evaporator.

A further object of the invention is to provide in an evaporator unit for use in oil filters and the like and wherein oil flowing into the evaporator is heated, a vent structure providing an inlet opening through which air flows into the evaporator and an outlet fitting communicating with the interior of the evaporator and through which air and volatile impurities in the oil flow in their escape from the evaporator; the outlet fitting being oriented so that a low pressure area is provided about the outlet opening thereof when a stream of air passes thereby during forward movement of a vehicle upon which the evaporator is mounted. Still a further object is to provide plate means within an oil filter that are operative to prevent channeling of the oil through the filter material. Yet a further object is to provide a combination oil filter and evaporator unit for use in vehicles and wherein the evaporator has certain portions thereof heated while the remaining portions of the evaporator are relatively cool; means being provided within the evaporator to selectively channel the flow of oil from the filter to the evaporator. Additional objects and advantages will appear as the specification proceeds.

An embodiment of the invention is illustrated in the accompanying drawing, in which—

Fig. 1 is a vertical sectional view of an oil filter and evaporator embodying my invention; Fig. 2 is a transverse sectional view taken on the line 2—2 of Fig. 1; Fig. 3 is a vertical sectional view taken on the line 3—3 of Fig. 1; and Fig. 4 is a vertical sectional view taken on the line 4—4 of Fig. 1 with the air vent unit omitted.

The apparatus illustrated in Fig. 1 comprises an oil filter which is designated generally with the letter A and an evaporator unit designated with the letter B. The oil filter A comprises an elongated dish-shaped casing 10 providing a chamber or compartment 11 therein. At its lower arcuate end, the casing 10 is equipped with a boss 12 having a threaded passage 13 extending therethrough. The threaded end 14 of a fitting 15 is threadedly received within the outer end of the passage 13 and the fitting at its lower end is provided with a drain cock 16 that may be selectively opened or closed by turning of the valve handle 17. Extending laterally from the fitting 15 is an elbow 18 connected by a fitting 19 to a flow conduit 20. Oil flows into the filter chamber 11 through the conduit 20 and passage 13 which provides an inlet for the filter.

A cover plate 21 encloses the chamber 11 and is supported upon the upper edge 22 of the casing 10. If desired, a gasket 23 may be interposed between the edge 22 and cover 21. Further, if desired, the cover 21 may be equipped with a depending annular flange 24 that extends downwardly about the casing 10 and serves to properly orient the cover upon the casing. The cover is held in place by means of an elongated stud 25 that is threaded at its upper end and extends outwardly through a boss 26 provided by the cover 21. A wing nut 27 may be used to draw the cover 21 downwardly upon the gasket 23. At its lower end 28, the stud 25 is equipped with external threads and is threadedly received within the passage 13. As is seen in Fig. 1, the lower end portion 28 of the stud is equipped with a longitudinally-extending flow passage 29 communicating with the passage 13 and with laterally-extending passages 30 communicating with the passage 29 and with the chamber 11.

The casing 10 is equipped internally with a plurality of support members 31 which receive thereon a plate 32 provided throughout the entire area thereof with a plurality of apertures 33 therein through which oil may readily flow. The area within the chamber 11 above the plate 32 is filled with a suitable filter material 34 that may be any of the conventional materials now in use and, for example, may consist of waste materials. The filter material 34 is confined by an upper plate 35 equipped throughout the entire surface thereof with a plurality of openings or apertures 36 through which oil may flow into the upper portion 11a of the chamber 11. The plate 32 and plate 35 are both centrally apertured to receive the stud 25 therethrough. A wing nut 37 threadedly received about the upper end portion of the stud 25 may be brought into engagement with the plate 35 to press it downwardly toward the waste or filter material 34. If desired, a pad 38 may be interposed between the bottom of the plate 35 and the filter material 34. The pad 38 should be relatively porous so that oil may flow freely therethrough and may, for example, be a felt material although it will be appreciated other materials may be used.

The evaporator unit B comprises a casing 39 having a bottom wall 40, an end wall 41, and side walls 42 and 43. Preferably, the casing 39 is cast integrally with the filter casing 10 and a wall portion of the casing 10 provides the arcuate end closure of the evaporator unit B. The casing 39, as is best seen in Fig. 4, provides an evaporator chamber 44 therein and similarly, a heating chamber 45. The evaporator chamber 44 is provided with a discharge or outlet port 46, as is best seen in Fig. 2, and with a plurality of inlet ports 47, as is seen best in Fig. 3. For purposes of identification, the inlet ports are designated with the numerals 47a through 47e. The heating chamber 45 is equipped with an inlet port 48 adjacent one end thereof, and with an outlet port 49 adjacent the opposite end thereof.

As is shown best in Fig. 1, the cover 21 for the oil filter is equipped with an integral laterally-extending portion 50 that engages the upper edges of the side walls 41, 42, and 43 of the unit B, and provides a closure for the evaporator chamber 44. Preferably, a gasket is interposed between the evaporator walls and the cover and the gasket may form a continuation or part of the gasket 23.

The evaporator B is equipped with a vent which comprises an air inlet tube 51 which extends through a boss 52 provided by the cover portion 50 and downwardly therefrom and into the chamber 44. At its outer end, the tube 51 is provided with an inlet opening 53 that is preferably inclined and that faces forwardly so that when the oil filter and evaporator unit are mounted upon a vehicle, the movement of the vehicle will cause a stream of air to flow into the port 53 and downwardly through the tube and into the chamber 44. The vent also includes an exhaust or outlet fitting 54 that extends through the boss 52 and communicates with the interior of the chamber 44 preferably at an elevation slightly above the inner end of the tube 51. The outlet tube 54 has a rearwardly-turned portion 55 providing a discharge opening 56 therein that faces rearwardly so that the movement of a vehicle equipped with the oil filter assembly will cause a stream of air to pass over the tube portion 55 and this will be effective to reduce the pressure about the port 56 and aid in drawing air and the gaseous materials from the chamber 44. If desired, the chamber 44 may be equipped with an angularly-oriented filter screen 57 that is best seen in Figs. 1 and 4.

The bottom wall 58 of the chamber 44 provides a lower floor portion 59 and an upper floor portion 60. The two floor portions have an angularly-extending wall or floor portion 61 extending therebetween. Thus the chamber 44 comprises a plurality of chamber portions, some having floor levels that are higher than the others. As can be seen best in Fig. 2, a guide rail 62 extends into the chamber 44 and along the upper floor level 60 and terminates short of the forward wall 41 to provide a flow passage 63 therebetween. The angularly-oriented floor portion 61 is equipped with a downwardly- and rearwardly-inclined guide member or barrier member 64 and also with a forwardly- and downwardly-inclined barrier 65. The inner end portions of the barriers 64 and 65 are spaced apart to provide a flow passage 66 therebetween.

As is apparent from an inspection of Fig. 3, the flow passages 47 communicate with the chamber 44 at different portions thereof and therefore at different elevations. The ports 47a and 47b communicate adjacent the lower floor level 59, the ports 47d and 47e communicate with the chamber adjacent the upper floor level 60, while the flow port 47c communicates with the chamber adjacent the inclined floor portion 61. It is desirable to close certain of the flow ports, particularly in cold weather, while opening all of the flow ports when the weather is relatively hot. The reason for this is to selectively regulate the temperature to which the oil is heated within the chamber 44. The flow ports may be closed manually, if desired, by simply inserting elongated strips over the arcuate wall portion of the unit B and by aligning these strips with the ports that it is desired to close. I prefer, however, to provide strips 67b and 67c for the flow ports 47b and 47c, respectively, that are controlled by heat. For example, the strips 67b and 67c may be bimetallic elements that normally close their respective ports and which are adapted to open the ports when a certain oil temperature is reached. These strips may have U-shaped end portions, such as the portion 68c seen in Fig. 1, which permit them to be hung over the arcuate end wall of the unit B. Screw members may be used, if desired, to anchor the strips in position and may serve as a means for adjusting the temperature of response of the bimetallic strips in a manner well known. Also, the reduced aperture 47a might be eliminated as a separate port and provided in the strip 67b in alignment with the aperture 47b.

*Operation*

In operation of the apparatus, the oil filter assembly will be mounted upon an engine and the flow conduit 20 will be connected in a suitable manner so that the lubricating oil of the engine will flow through the conduit, through the passage 13, and into the filter chamber 11. The outlet port 46 of the unit B will also be suitably connected into the lubricating circuit of the engine so that the cleansed oil will return thereto. The oil will flow into the filter chamber 11 and upwardly through the filter material 34 and into the upper chamber portion 11a. It will then pass through certain of the inlet ports 47 to the evaporator chamber 44.

It has been found that oil flowing through filter material tends to form channels therein and to constantly flow through these same channels. Thus the operation of a filter is not efficient unless the filter material is changed quite frequently. The channeling problem is avoided in my structure by the provision of a plate 69 that engages the side walls of the filter casing 10 and is interposed between the plates 32 and 35. The plate 69 may be of any suitable construction but preferably forms angularly-extending flow passages 70 therethrough and staggered wall portions 71 and 72 which are operative to break up the stream of oil flowing through the plate. Thus the oil is dispersed and takes devious courses through the filter material and the beneficial effects of the filter are not lost through channeling of the oil.

The ports 48 and 49 of the heating chamber 45 may be connected to a suitable source of heat. For example, these ports may be connected within the water-cooling system of an engine and the heated water will flow into and through the chamber 45. Normally, the operating temperature of an engine is approximately 180° and the temperature within the chamber 45 will, then, approximate 180°. In any event, the cooling water within an engine will not exceed a temperature of about 212°, and such a temperature is not excessive and will not cause the more volatile oil fractions to be vaporized. Heretofore, the temperature reached in evaporator units has frequently been in the nature of 400° which is much too high for efficient operation. The evaporator chamber 44 will then be heated by the flow of hot water or other medium through the chamber 45.

Oil from within the filter chamber 11 will flow into the evaporator chamber 44 through the ports 47 or such of the ports that are open. It will be noted that the port 47a has a rather small diameter and will not generally provide a sufficient opening to permit all of the oil to flow therethrough and into the chamber 44. Therefore, the level of the oil within the filter chamber 11 will rise above the port 47a and will flow next through the port 47b, if it is open, then through the next highest port 47c, and finally, through the uppermost ports 47d and 47e. The temperature to which the oil is heated within the chamber 44 will depend, for the most part, upon the area within the chamber into which the oil flows. For example, if the intermediate ports 47b and 47c are closed, most of the oil will flow into the chamber 44 through the ports 47d and 47e. The oil will then flow over the upper floor level 60 which is heated by the chamber 45, and then downwardly along the inclined floor 61, which is also heated by the chamber, and finally to the lowermost floor level 59 which is not directly heated by the chamber 45 and finally therefrom through the discharge port 46.

When the weather is relatively cold, it will be most desirable to have the oil flow through the uppermost ports 47d and 47e for in this manner the oil will be heated to a greater temperature within the chamber 44 because of the much longer flow route that the oil must travel in reaching the outlet 46. On the other hand, when the temperature is relatively high and the oil is therefore at a much higher temperature, it will be more desirable to have the oil flow through the intermediate ports 47b and 47c for then the oil will flow along the inclined floor level 61 and barrier 65 and directly to the lower floor level 59 and discharge port 46. Thus the oil will not be subjected to as much heat while within the chamber 44, but since the starting temperature was already quite high, the volatile oil and gasoline, etc., will be driven from the oil. Preferably, then, the port closures 67b and 67c are arranged so that the port 47b and possibly the port 47c are normally closed when the oil is at a low temperature, but are operative to open the ports when the oil assumes a higher predetermined temperature so that the flow path of the oil through the evaporator 44 is shortened.

The volatile vapors within the chamber 44 are quickly driven therefrom by the flow of air through the tube 51 and thereafter outwardly through the fitting 54. If the vehicle is moving, a considerable flow of air through the chamber 44 is provided because of the orientation of the vent inlet port 53 and orientation of the vent outlet port 56, as has been heretofore described.

While in the foregoing specification an embodiment of the invention has been set out in considerable detail for purposes of illustration, it will be apparent to those skilled in the art that considerable change may be made in these details without departing from the spirit and principles of the invention.

I claim:

1. In an oil reclaiming apparatus, an evaporating chamber having an upper and lower floor level, means for heating said chamber and for concentrating the heat in the area of said upper floor level, means for admitting oil to either of said floor levels, means for varying the amount of oil admitted to each floor level, an outlet port adjacent said lower floor level, and a vent communciating with said chamber.

2. The structure of claim 1 in which an inclined floor portion extends between said upper and lower floor levels, and staggered barriers are mounted within said chamber to provide a defined flow path between said upper and lower floor levels.

3. The structure of claim 1 in which said vent comprises an inlet tube extending into said chamber and communicating therewith and having an opening for the flow of air thereinto, and an outlet tube communicating with said chamber.

4. The structure of claim 1 wherein said chamber is provided with a plurality of inlets, at least one of the inlets communicating with said chamber adjacent said lower floor level.

5. The structure according to claim 4 in which means are provided for selectively closing some of said inlets.

6. The structure of claim 5 in which said last-mentioned means comprises thermal-responsive closure members.

7. In an oil reclaiming apparatus, an evaporating chamber having a single floor provided with upper and lower floor levels, a heating compartment in heat-exchange relation with said upper floor level, means for heating said compartment, a plurality of oil inlets to said chamber adjacent said floor levels, there being an inlet adjacent each level, an outlet port adjacent said lower floor level, and vent means communicating with said chamber to provide for the escape of vapors therefrom.

8. The structure of claim 7 wherein an inclined floor extends between the uppermost and lowermost floor levels, and wherein at least some of said inlet ports communicate with said chamber adjacent said inclined floor.

9. The structure of claim 7 in which said vent means comprises an inlet tube extending into said chamber and having an inlet opening for the flow of air thereinto, and an outlet tube communicating with said chamber and being provided with a discharge port oriented in an opposite direction to said inlet opening.

10. In an oil reclaiming apparatus, an evaporating chamber having an upper and lower floor level, a heating compartment in heat exchange relation with said upper floor level, means for heating said compartment, a plurality of oil inlets to said chamber adjacent said floor levels, thermoresponsive means for selectively opening and closing at least some of said inlets, an outlet port adjacent said lower floor level, and vent means communicating with said chamber to provide for the escape of vapors therefrom.

11. In an oil reclaimer: a vaporizing chamber having a floor and a removable closure; a vaporizing unit in said chamber having an inclined vaporizing surface over which oil may flow in a thin film; oil inlet means through which oil may enter said chamber; means associated with said oil inlet means for permitting a portion of the oil admitted to the chamber to flow over said vaporizing surface; an oil outlet; a bypass for conducting all but said portion of the oil to the outlet without flowing over the vaporizing surface; means for vaporizing impurities from the oil flowing over the vaporizing surface; and vent means through which vaporized impurities may escape from the chamber.

12. In an oil filter structure, a casing providing a chamber therein, filter material within said chamber, and a plate mounted within said chamber and being provided with a plurality of apertures forming flow passages therethrough, said plate being provided with means for breaking up the flow of oil therethrough, and said casing being equipped with an inlet and with an outlet spaced therefrom.

13. The structure of claim 12 in which said plate is provided with laterally-turned flange portions about said apertures that are operative to disperse oil flowing through the apertures.

14. The structure of claim 1 in which a screen is interposed across said evaporating chamber.

15. In an oil reclaiming apparatus, an evaporating chamber with a single floor which provides a heat exchange surface at least part of which is inclined, means for heating different zones of said floor to different temperatures, means for admitting oil to each of said zones, means for varying the admission of oil to said chamber at the hotter zones of said floor, and an oil outlet only from the coolest zone of said floor.

16. The structure of claim 15 in which the means for varying the admission of oil to the hotter zones includes thermostatic means for increasing admission of oil when the temperature of the chamber is low.

17. In an oil reclaiming apparatus, an evaporating chamber provided with a single heat exchange surface over which oil may flow, means for heating said heat exchange surface, an oil outlet, a plurality of openings for admitting oil to said surface at varying distances from said outlet, and means for varying the admission of oil to said surface through openings other than that nearest the outlet so as to vary the time most of the oil is in contact with the heat exchange surface.

18. In an oil reclaimer for a motor vehicle, an evaporating chamber having a heat exchange surface, means for admitting oil to said heat exchange surface, an oil outlet from said heat exchange surface, and positive vent means for said chamber, said vent means including an air inlet adapted to conduct air to said chamber from a stream of air passing over evaporating chamber and an air outlet pipe having an opening turned rearwardly in said air stream for removing by an aspirating action air and impurities volatilized from the oil.

References Cited in the file of this patent

UNITED STATES PATENTS

| | | |
|---|---|---|
| 788,359 | Kasper | Apr. 25, 1905 |
| 1,751,725 | Cross | Mar. 25, 1930 |
| 2,020,570 | Pettit | Nov. 12, 1935 |
| 2,061,687 | Wilkoff | Nov. 24, 1936 |
| 2,161,964 | La Brecque | June 13, 1939 |
| 2,173,631 | Niedens | Sept. 19, 1939 |
| 2,282,087 | Pena | May 5, 1942 |
| 2,294,330 | Clark | Aug. 25, 1942 |
| 2,392,548 | Pogue | Jan. 8, 1946 |
| 2,533,945 | Legatski | Dec. 12, 1950 |
| 2,593,227 | Wagner | Apr. 15, 1952 |
| 2,645,607 | Allen | July 14, 1953 |